United States Patent [19]

Dell et al.

[11] 4,451,492

[45] May 29, 1984

[54] REAL CREAM FROZEN WHIPPED TOPPING COMPOSITION

[75] Inventors: William J. Dell, Howell, N.J.; Alexander A. Gonsalves, Yardley, Pa.; William E. Flango, Hamilton Square, N.J.; Thomas E. Guhl, Jamesburg, N.J.; Lawrence H. Freed, Plainsboro, N.J.; John T. Oppy, Allentown, N.J.; Suzanne Baratta, Plainsboro, N.J.; Andre J. Eydt, New York, N.Y.

[73] Assignee: General Foods Corporation, White Plains, N.Y.

[21] Appl. No.: 446,283

[22] Filed: Dec. 2, 1982

[51] Int. Cl.³ .................... A23C 13/14; A23G 9/00
[52] U.S. Cl. .................................. 426/564; 426/565; 426/570
[58] Field of Search ............... 426/567, 570, 568, 804, 426/564, 578, 565

[56] References Cited

U.S. PATENT DOCUMENTS

| | | | |
|---|---|---|---|
| 3,968,267 | 7/1976 | Ogasa et al. | 426/570 |
| 4,107,343 | 8/1978 | Petricca | 426/570 |
| 4,199,608 | 4/1980 | Gilmore | 426/570 |
| 4,251,560 | 2/1981 | Dell et al. | 426/570 |
| 4,370,353 | 1/1983 | Yagi et al. | 426/570 |

FOREIGN PATENT DOCUMENTS 104407  3/1979  Japan .................................. 426/570

*Primary Examiner*—Jeanette M. Hunter
*Attorney, Agent, or Firm*—Walter Scott; Thomas R. Savoie; Daniel J. Donovan

[57] ABSTRACT

A process for making a freeze-thaw stable frozen whipped topping containing milk fat. The process for making this topping comprises the inclusion of a calcium chelating agent in the topping's ingredients.

8 Claims, No Drawings

REAL CREAM FROZEN WHIPPED TOPPING COMPOSITION

BACKGROUND OF THE INVENTION

This invention relates to a process for preparing frozen whipped topping compositions. More particularly, it relates to a process for preparing frozen whipped topping compositions containing milk fat and which have an extended refrigerator shelf life after thawing. This composition is suitable for use as a whipped cream substitute and as a topping for desserts, icing for cakes and the like. Previously, frozen whipped toppings based upon milk fat (i.e., containing real cream) have generally had a very short shelf life, or poor eating qualities after thawing. These prior art samples became loose, soupy (soft, no resilience), open textured (grainy, webby) and exuded free liquid within hours after thawing in the refrigerator. Furthermore, freeze-thaw stability was generally accompanied by a heavy, thick mouthfeel, uncharacteristic of freshly whipped cream and even then the refrigerator stability was limited (i.e. 5 to 7 days). The present invention extends the refrigerator shelf life of the topping based upon milk fat for a period of 7 to 30 days or longer while maintaining the mouthfeel, texture and appearance characteristic of freshly whipped cream and represents an advance over the previously available frozen whipped toppings based upon milk fat.

While U.S. Pat. No. 3,431,117 by Lorant teaches how to prepare a stable frozen whipped topping, the specific problem of stabilizing a milk fat system is not dealt with. U.S. Pat. No. 4,251,560 issued to Dell et al. discloses a process for making a frozen whipped topping, wherein milk fat is the only lipid source, with an extended refrigerator shelf-life by using a modified starch. Jonas in U.S. Pat. No. 4,012,533 teaches an alternative method which is unaffected by the addition of calcium salts. Nonetheless, as consumers desire the milk fat taste in whipped topping, other processes for making these products are needed.

Phosphates have been known to affect various properties of dairy fluids, such as heat denaturization of milk proteins and curd size. In U.S. Pat. No. 2,853,391, Harrison teaches that phosphates improve the whipping and texture properties of an ice cream mix. However, ice creams have an overrun maximum of 105%, and are not stable when stored in a refrigerator.

Therefore, it is a feature of the present invention to provide a process for preparing a frozen whipped topping composition based upon milk fat, which composition has extended refrigerator shelf life after thawing.

A further feature of the present invention is to provide a whipped topping composition which upon thawing, has the attributes of freshly prepared whipped cream.

SUMMARY OF THE INVENTION

Briefly, the instant invention provides a process for preparing a frozen whipped topping comprising milk fat and having improved stability upon thawing and refrigerator storage comprising blending milk fat, emulsifiers, stabilizers, carbohydrate, water and a phosphorous salt, pasteurizing and homogenizing these ingredients to form an emulsion, cooling the emulsion, whipping the emulsion, and then freezing the emulsion. The phosphorous salt employed is of a phosphorous oxyacid and has a $pK_a$ between about 2 and about 9. Upon thawing, the frozen whipped topping so prepared is characterized by its excellent volume, texture and eating properties, the superior storage stability after thawing, as well as the convenience offered to the consumer.

DETAILED DESCRIPTION OF THE INVENTION

The process of the present invention makes it possible to prepare a frozen whipped topping composition containing real cream which may be distributed and sold in a frozen state and which upon thawing retains its excellent volume, smooth, continuous, light and fluffy texture, and eating properties for an extended period of time. The thawed composition may be stored at refrigeration temperatures for a period of about 7 to 30 days or longer without an apparent loss in volume, texture and eating properties. Thus, the composition may be described as having exceptional freeze-thaw stability as well as extended stability upon thawing at refrigerated temperatures.

The unique and surprising characteristic of the present invention is the ability to employ real cream, i.e. milk fat, in the preparation of a frozen whipped topping which is stable upon thawing. The fat employed is a milk fat, such as that derived from real cream, butter fat, anhydrous milk fat or other milk fat sources. By the use of milk fat, the resultant topping imparts a fast melt-down in the mouth, thus providing a mouthfeel close to freshly prepared whipped cream.

Nonetheless, the milk fat can be used alone or in any combination with any of the natural animal or vegetable fats or oils commonly employed in food products. Thus, any combination of edible oils, semi-solid or solid fats, can be employed. Such fats or oils may be fully or partially hydrogenated. Suitable fats include lard, modified lard, margarine, as well as various vegetable and animal oils. Additionally, oils such as coconut oil, palm kernel oil, cottonseed oil, peanut oil, olive oil, corn oil, soy oil, and the like may be utilized. Preferably, the non-milk fat is low melting and also has the desired melt-away characteristics at mouth temperatures. It is preferred that at least about 1% of the fat, by weight, is milk fat, and more preferably, at least about 6% of the fat is milk fat. It is further preferred that at least about 11% of the fat is milk fat and it is most preferred that at least about 20% of the fat is milk fat. However, it is preferred that at least about 25%, more preferably at least about 50%, and most preferably at least about 75%, of the lipid material used be non-milk fat.

The protein which may be employed may be any of a large group including non-fat milk solids, water soluble soy protein derivatives, egg albumin, gelatin, sodium caseinate, calcium caseinate, and the like, and mixtures thereof. The protein apparently serves to effect stabilization of the whipped topping composition.

Stabilizer, other than protein, is also desirably included in the frozen whipped topping composition. Such stabilizer is preferably a natural, i.e., vegetable, or synthetic gum, and may be, for example, carrageenan, xanthan gum, guar gum, alginate, and the like or carboxymethylcellulose, methylcellulose ether and the like, and mixtures thereof.

A wide variety of emulsifiers may be employed in the compositions which are prepared by the process of this invention. Thus, hydroxylated lecithin, mono- or diglycerides of fatty acids such as monostearin and dipalmitin, polyoxyalkylene ethers of fatty esters of polyhydric alcohols such as the polyoxyethylene ethers of sorbitan monostearate or the polyoxyethylene ethers of sorbitan distearate; fatty esters of polyhydric alcohols, such as sorbitan monostearate; mono- and di-esters of glycols and fatty acids such as propylene glycol monostearate and propylene glycol monopalmitate; and partial esters of carboxylic acids such as lactic, citric, and tartaric acids with the mono- and di-glycerides of fatty acids such as glyceryl lactopalmitate and glyceryl lactooleate, and polyglycerol esters of fatty acids. The fatty acids employed in the preparation of the emulsifiers include those derived from beef tallow and coconut, cottonseed, palm, peanut, soybean and marine oils. Preferably, a combination of emulsifiers is employed, typically poly-oxyethylene sorbitan monostearate and sorbitan monostearate.

A carbohydrate is employed in the frozen whipped topping composition to provide bulk and the desired sweetness. Thus, sugars such as sucrose, dextrose, fructose, lactose, maltose, invert sugars, corn syrup, and mixtures thereof may be utilized as well as dextrins and low calorie sweeteners such as L-aspartic acid derivatives and saccharin.

A calcium chelating or phosphorous salt of the instant invention may be any phosphorous oxyacid salt which is essentially free of calcium and has a $pK_a$ between about 2 and about 9. Thus, the essentially free of calcium phosphates, pyrophosphates, metaphosphates, and polyphosphates, preferably the alkali metal phosphates, pyrophosphates, metaphosphates and polyphosphates with $pK_a$ between about 2 and about 9 are useful. It is more preferred that the salt be a sodium or a potassium salt, and it is further preferred that the salt be chosen from the group comprising monosodium phosphate, monopotassium phosphate, disodium phosphate, dipotassium phosphate, tetrasodium pyrophosphate, tetrapotassium pyrophosphate and combinations thereof. Nonetheless, it is most preferred that the salt be chosen from disodium phosphate, dipotassium phosphate, tetrasodium pyrophosphate, tetrapotassium pyrophosphate or combinations thereof. In any case, it is preferred that the amount of phosphorous salt added be between about 0.001% and about 1% of the total foam weight. However, it is more preferable that the phosphorous salt be between about 0.01% and about 0.5%, and most preferably, the phosphorous salt weight is between about 0.01% and about 0.1% of the total foam weight.

Other ingredients which may be included in the frozen whipped topping compositions prepared by the process of this invention are flavoring agents, colorants or dyes, vitamins, minerals, and the like. Suitable flavoring agents include vanilla, chocolate, coffee, maple, spice, mint, caramel, fruit flavors and flavor intensifiers (e.g. salt).

The amounts of milk fat, emulsifier, stabilizer, carbohydrate, and optionally included ingredients as well as the amount of water employed in the preparation of frozen whipped topping compositions according to the process of this invention can be varied over relatively wide limits. When homogenization of the composition using a pressure of at least 6000 p.s.i. (420 kg/cm²) is employed, this allows considerable latitude in the amounts of the various ingredients. The amount of milk fat will be sufficient to provide a stable whipped topping which has good mouthfeel and yet, upon melting, does not leave an undesirable film on the palate. Sufficient amounts of modified starch, emulsifier, and stabilizer will be used to impart stability to the topping and to impart good whipping properties to the composition. Further, the amount of carbohydrate will be varied over a range sufficient to provide desired bulk and sweetness level in the finished topping composition. A preferred range of ingredients is as follows:

| Ingredients | Percent by weight |
| --- | --- |
| Fat (solids basis) | 10.0–30.0 |
| Milk fat | 0.1–22.5 |
| Non-milk fat | 7.5–29.9 |
| Protein | 0.5–3.5 |
| Emulsifier | 0.2–2.0 |
| Stabilizer (gum) | 0.02–2.0 |
| Water | 35.0–65.0 |
| Carbohydrate (sugar) | 15.0–35.0 |
| Flavoring Agent | 0.2–2.0 |
| Colorant | 0.01–0.05 |
| Phosphorous Oxyacid Salt | 0.001–1.0 |
| Modified starch | 0.0–1.0 |

The ingredients are blended in suitably desirable ratios to form a mix. The mix may then be heat pasteurized, i.e. subject to a sufficiently high temperature for a period of time effective to solubilize and disperse the ingredients of the mix, and kill all pathogens, e.g. at a temperature of about 150° F. (65° C.) to 165° F. (75° C.), for about 10 to about 30 minutes, or similar time-temperature relationships (e.g. high-temperature short time). The mix is then passed through a homogenizer of the typical dairy type. Although homogenization may be accomplished in one stage, for best results, homogenization is carried out in two stages, operated with the pressure maintained during the first stage preferrably at a minimum of 6000 p.s.i.g. (420 Kg/cm²) and a maximum of about 10,000 p.s.i.g. (700 Kg/cm²), preferably between about 7000 p.s.i.g. (490 Kg/cm²) and about 7800 p.s.i.g., (550 kg/cm²) more preferably between about 7200 p.s.i.g. (500 Kg/cm²) and about 7600 p.s.i.g. (530 Kg/cm²), and the second stage at a pressure of at least about 500 p.s.i.g. (35 Kg/cm²), more preferably at least about 550 p.s.i.g. (39 Kg/cm²). The mix temperature is usually maintained at a temperature of about 155° F. (70° C.) to 180° F. (80° C.) during homogenization. The emulsion is then cooled, e.g. to about 27° F. (−3° C.) to 45° F. (7° C.) and may be held at this temperature for a period of time sufficient to allow fat crystallization. The emulsion is then passed through a whipper for the incorporation of a gaseous medium, such as air or an inert gas, for example: nitrogen, carbon dioxide, nitrous oxide or the like. The whipper may be of conventional construction such as a Votator Continuous Recirculating Mixer (Trademark). The emulsion is whipped and aerated to between about 150% to about 350% overrun, preferably to between about 200% to about 300% overrun, and more preferably to between about 350% to about 300%, packaged and frozen.

The process of the present invention thus produces a frozen whipped topping composition containing milk fat which is stable and remains smooth after several freeze-thaw cycles. The frozen topping composition, upon thawing, has a prolonged refrigeration shelf life, while possessing the light, fluffy, smooth and continuous texture, mouthfeel, appearance, volume and eating quality characteristic of freshly prepared whipped cream. To use the frozen whipped topping composition, the product is defrosted, for example, by being left for 3½ hours (for an 8.0 ounce or 226 gram container) in the refrigerator. The composition after thawing is thus ready for immediate table use without the necessity of reconstitution or whipping.

In order to illustrate the present invention, but in no matter to restrict it, the following example is given:

EXAMPLE 1

The frozen topping composition was prepared containing the following ingredients:

|  | Percent by Weight |
|---|---|
| Heavy Cream (40% fat) | 14.1 |
| Water | 35.38 |
| Emulsifiers | 0.47 |
| Flavors & colors | 0.4 |
| Gums | 0.17 |
| Disodium phosphate | .04 |
| Sucrose | 14.0 |
| Dextrose | 1.00 |
| Corn Syrup (D.E.42) | 12.60 |
| Vegetable Oil | 20.34 |
| Sodium Caseinate | 1.5 |
|  | 100.0% |

The vegetable oil and then the colors were added into a mixing vessel. Thereafter, the disodium phosphate, which had previously been dispersed in the water, was added as an aqueous solution. Next, the cream and the emulsifiers were added. Thereafter, the dry ingredients and the carbohydrates were added. The ingredients were mixed together until solubilized and dispersed, and then pasteurized at 155° F. (65° C.) for 15 minutes. During pasteurization, the flavors were added to the solubilized and dispersed ingredients. The pasteurized mix is then homogenized in two stages to form the emulsion. The first stage homogenization employing pressures of about 7400 p.s.i.g. (520 Kg/cm$^2$) and the second stage employing pressures of 600 p.s.i.g. (42 Kg/cm$^2$). The homogenized mix is then cooled for 20 minutes at a temperature of 38° F. (3° C.). The cooled mix is then whipped and aerated to an overrun above about 250%. The whipped mix is then packaged and frozen.

The composition so prepared is characterized by its excellent freeze-thaw stability even after several freeze-thaw cycles. After thawing and storage at refrigerator temperatures (about 40° F., 5° C.) for 5 days and longer, the texture remained light, fluffy, continuous and smooth and did not become loose, soupy (no resilience), open textured (grainy, webby), or exude free liquid. Over the five days of refrigeration storage, the thawed topping composition maintained a mouthfeel, texture, volume, appearance and eating quality characteristic of freshly prepared whipped cream.

EXAMPLE 2

A product was produced according to the procedure of Example 1, except that no calcium chelating salt was added. This product became noticeably different, i.e., softer and weaker, within 2 days and became soft and soupy with 6 days of being thawed and stored in a refrigerator.

What is claimed is:

1. A process for making a freeze-thaw stable, edible foam comprising the steps of:
   (a) adding a dairy ingredient comprising milk fat to a mixing vessel;
   (b) adding a food approved, calcium chelating salt to the mixing vessel, wherein said salt:
      (i) is essentially free of calcium;
      (ii) is the salt of a phosphorous oxyacid;
      (iii) has a pK$_a$ between 2 and about 9;
      (iv) the amount of said salt added is between about 0.001% and about 1% of the total ingredients in the mixing vessel, by weight, and said amount of chelating salt is effective to impart freeze-thaw stability to the foam;
   (c) solubilizing and dispersing the ingredients within said mixing vessels;
   (d) homogenizing said solubilized and dispersed ingredients at a pressure of at least 6000 p.s.i.g. so as to form an emulsion; and
   (e) whipping and aerating said emulsion to an overrun of at least about 150% by volume.

2. A process according to claim 1 wherein the pK$_a$ of the chelating salt is between 5 and 9.

3. A process according to claim 1 wherein the chelating salt is chosen from the group comprising monosodium phosphate, monopotassium phosphate, disodium phosphate, dipotassium phosphate, tetrasodium pyrophosphate, tetrapotassium pyrophosphate and combinations thereof.

4. A process according to claim 1 wherein the chelating salt is chosen from the group comprising disodium phosphate, dipotassium phosphate, tetrasodium pyrophosphate, tetrapotassium pyrophosphate and combinations thereof.

5. A process according to claim 1 which further comprises the step homogenizing the homogenized emulsion in a second stage homogenizer at a pressure of at least 500 p.s.i.g.

6. A process according to claim 1 which further comprises the step of cooling the homogenized emulsion to a temperature within the range of about 27° F. to about 45° F.

7. A process according to claim 1 which further comprises the step of pasteurizing the contents of the mixing vessel before homogenizing said contents.

8. A product prepared by the process of claim 1.

* * * * *